(12) United States Patent
Gartner et al.

(10) Patent No.: US 6,438,590 B1
(45) Date of Patent: Aug. 20, 2002

(54) COMPUTER SYSTEM WITH PREFERENTIAL NAMING SERVICE

(75) Inventors: M. Scott Gartner; Shell S. Simpson, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/291,400

(22) Filed: Apr. 13, 1999

(51) Int. Cl.$^7$ ............................................... G06F 13/00
(52) U.S. Cl. ....................................................... 709/219
(58) Field of Search ............................. 709/219, 226, 709/228; 717/3

(56) References Cited

U.S. PATENT DOCUMENTS

| | | | |
|---|---|---|---|
| 5,475,817 A | | 12/1995 | Waldo et al. ............... 395/650 |
| 5,745,683 A | | 4/1998 | Lee et al. ................. 395/200.8 |
| 5,761,499 A | | 6/1998 | Sonderegger ............... 395/610 |
| 6,014,700 A | * | 1/2000 | Brainbridge ................ 709/226 |
| 6,286,052 B1 | * | 9/2001 | McCloghrie ................ 709/228 |
| 6,321,219 B1 | * | 11/2001 | Gainer et al. ................... 707/3 |

OTHER PUBLICATIONS

Iona Technologies, OrbixWeb, "The Internet ORB" copyright date specified only as 1998.
Iona Technologies, OrbixWeb, "What are the Advantages of Having a Professional Edition of OrbixWeb Rather Than a Standard Edition?", copyright date specified only as 1997–98.
Semaphore, A Semaphore White Paper, "Locating and Managing ORB Objects", copyright date specified only as 1997.
Inprise Corporation, "VisiBroker Naming Service", copyright date specified only as 1998.
Kathleen Lossau, "A Network–Centric Architecture for Distributed C41", Austin Info Systems, Inc.
Object Management Group, "The Common Object Request Broker: Architecture and Specification", Revision 2.0, date specified as Jul. 1992, as printed from the World Wide Web on Feb. 2, 1999.

* cited by examiner

Primary Examiner—David Wiley

(57) ABSTRACT

A computer system includes a distributed application program having shared objects on a client workstation and on a server. Installation of the application program assures that an object request broker, a preferential naming service (PNS), PNS registry, and a portion of the application program are executable on the client workstation. In operation, the application program makes a request of the PNS containing an object name and criteria for determining an object reference. The PNS accesses the PNS registry to select candidate records according to the object name and version criteria. In addition, for a tree structured registry, the PNS responds to scope criteria and cross references to identify candidates. A tree structured registry may include references to portions of other tree structured registries. The PNS determines a policy from a candidate record, then determines an object reference by applying the policy. When needed, the PNS activates a local object or contacts a naming service on the server to determine the object reference. The object reference is then provided to the application program. The policy may dictate that candidate records refer only to local objects, only to remote objects, that a local object if viable is preferred, or that a remote object if viable is preferred. The request may include a version criteria directing use of an exact version or use of a latest version.

20 Claims, 8 Drawing Sheets

| | 600 |
|---|---|
| 602 | ROOT |
| 604 | 2SHARE |
| 606 | ENCRIPT V2 (LO) |
| 608 | DISCOVER V1 [XNS\SHARED](RO) |
| 610 | TRANSL8 V5 [XNS\SHARED](LP) |
| 612 | SLICKR |
| 614 | REPORT V1 (LO) |
| 616 | ANALYZE V1 [XNS\SLICKR](RP) |
| 618 | ANALYZE V2 [XNS\SLICKR](RP) |
| 620 | COUNTX |
| 622 | REPORT V3 [XNS\COUNTX](LP) |
| 624 | ANALYZE V4 [XNS\COUNTX](LP) |
| 626 | PRINT-DRV V1 [XNS\PRINTER](LP) |
| 628 | 2TEST |
| 630 | ROLLUP V9 (LO) |
| 632 | ENCRYPT V2 [ROOT\SHARE] |
| 634 | CALC V1 (LO) |
| 636 | CALC V3 (LO) |
| 638 | CALC V2 (LO) |
| 640 | SHAREDSQL [XNS\SHARED\SQL] |
| 642 | SHARE [ROOT\2SHARE] |

FIG. 6

COMPUTER SYSTEM WITH PREFERENTIAL NAMING SERVICE

FIELD OF THE INVENTION

Embodiments of the present invention relate to computer systems hat accomplish distributed processing with shared objects, and to methods of installing and maintaining distributed processing programs.

BACKGROUND OF THE INVENTION

A distributed application program is a set of member programs written for cooperation on a network of computers. Each computer is a node of the network. Each member generally operates on a physically separate node and communicates with other members of the set to accomplish a distributed processing objective. Examples of such objectives include sharing information, sharing access to a peripheral input or output device, and sharing other services.

The basic unit of information storage is the computer file and, for executable information, the program object. To share information, a conventional service at a minimum employs a naming convention for files, accesses a file by its name, and makes a copy of the contents of the file onto a destination node for efficient use (e.g., reading and writing) by the member at a requesting node. While an application program may exist as a file or group of files, such a program in operation may be better understood as a process involving a collection (or set) of objects, each object being able to communicate with other objects by sending and receiving messages and able to perform requested services (i.e., operations). An object may control access or use of data by, for example, providing a limited number of standard operations on the data. Sharing a service is conventionally accomplished either by copying the requisite program files to the requesting node, or by employing a naming convention (e.g., an application program interface) and communicating messages (i.e., passing parameters and results) with objects of the member programs that make up the service.

As an example of a computer system with multiple services, consider a conventional office computer system for word processing. Each word processing application program may require a discovery service to locate printers it can use. Because the number and types of printers in an office computer system is subject to change, a word processing application program may call the discovery service to obtain current information about printers. When the discovery service searches the network to identify printers, the discovery service uses a significant portion of the computer network capability, perhaps slowing other users' access to files on networked disk drives. To prohibit nonessential network traffic related to each word processor's request for discovery, a system manager may locate the discovery service on only one computer of the network and require each word processing application program to call the same discovery service. This one discovery service is then able to search for printers, perhaps once per day, storing the search results and then respond to all requests for discovery with the result of the daily search; as opposed to performing a search in response to each separate request for discovery.

Communication between objects (e.g., an object of a word processing application program and an object of a discovery service) may be obtained using the industry standard Common Object Request Broker Architecture (CORBA). The structure and operation of CORBA and its components is described in "The Common Object Request Broker: Architecture and Specification" and references cited therein all of which are incorporated herein by reference.

Such an architecture may include a naming service. The naming service includes a database that associates an object name and a corresponding object reference. Each object desiring communication with another object calls the naming service, passing to it a name of the desired object. For example, when a word processor application program having a printer object desires to communicate with a reporting object of a discovery service, the printer object calls the naming service and passes the name of the reporting object. The naming service returns to the printer object an object reference to the reporting object. The object reference may then be used in subsequent communication.

Distributed application programs based on CORBA are conventionally implemented according to design rules that may complicate installation and maintenance. For example, such an application program is expected to be able to contact the CORBA object request broker (ORB) to obtain access to a shared object. The distributed application program must be installed and maintained to account for the cases when the ORB is completely unavailable and when service by the ORB is likely to be inefficient from a system operations standpoint. Information to intelligently handle these cases is generally unavailable to the programmer who develops the application program. Programmers conventionally assume that the ORB is available when the application program is executing; and, that the source code for the application program will be revised if systems efficiency becomes an issue. Application programs built on these assumptions may be impractical for mass marketing.

A distributed application program exhibits an object sharing strategy in the manner in which it was programmed to behave. When developing the application program, a programmer's assumptions regarding object sharing constitute a sharing strategy. For example, the program may be written on the assumption that a particular object is shareable or may (at run time) determine whether a particular object is shareable. For each shareable object, the sharing strategy includes assumptions or determinations concerning: (a) whether the services and objects needed to permit sharing are actually available; (b) whether sharing will be accomplished through a CORBA ORB; (c) whether sharing will be accomplished in some other manner than a CORBA ORB; (d) whether similarly named objects are assumed not to exist, are expected to exist, or are to be discovered or confirmed by testing; (e) where similarly named objects are presently located; and (f) which of several similarly named objects is to be used. When developing a service for multiple computing environments, program complexity increases dramatically as the sharing strategy becomes more sophisticated.

In many cases, placing the intelligence to revise object sharing strategies in each application program wastes system resources. For example, when each application program must contain the logic for determining a sharing strategy for efficient network operation, the network overhead involved in cooperating with the network server to make an efficiency determination may consume the efficiency expected to be gained.

A system manager may not be able to revise the sharing strategy implemented by the programmer. Inconsistent sharing strategies of several application programs may interfere with installation or concurrent use of such application programs. If a system manager determines that network utilization would improve if object sharing were revised, the system manager may be faced with reprogramming each service that uses the particular shared object. In complex systems this approach to improved network efficiency may be cost prohibitive.

Another conventional approach is to expect the user to maintain object sharing strategies. A CORBA based service cannot expect the user to supply or maintain object sharing strategies because the user may be unaware that shareable objects have been installed, relocated, or deleted. The user may be unaware and unable to verify that greater system operating efficiency may result when an object is shared with or without using the CORBA ORB.

When, for example, a new word processor is to be added to the computer system described above, the word processor may fail because objects on remote nodes were not found and used. At the time of installation, it may be impossible to specify in advance an appropriate object sharing strategy. Because neither an application program developer (a programmer), nor a system manager, nor a skilled user may be available to determine an appropriate initial strategy or to revise the strategy in response to other system modifications over time, the computer system and/or the new application program may not perform as expected. Without a way to overcome these difficulties, computer systems that accomplish distributed processing with shared objects may not find wide acceptance by unskilled users and such systems and application programs may not be economially provided through mass marketing channels.

SUMMARY OF THE INVENTION

A memory, according to various aspects of the present invention, includes indicia of a method for providing an object reference in response to a request. The request originates on a first workstation and includes a first object identifier. The method includes the following steps in any order: (a) determining a policy in accordance with the first object identifier; (b) determining a selected object reference in accordance with the policy, wherein the policy governs selection between first indicia of a first object that would, if selected, execute on the first workstation and second indicia of a second object that would, if selected, execute on a second workstation; and (c) providing the selected reference.

According to various aspects of such a memory, operation of a computer system in accordance with the method provides several benefits. A system manager may revise the policy without having to revise the underlying program that made the request for an object identifier. Further, the policy so maintained by the system manager may differ from what could have been anticipated by the programmer of the underlying program that made the request. Examples of a few policies that may be implemented by the system manager include a policy that may dictate use of an object on the same workstation from which the request was made, dictate use of an object on a different workstation than the workstation from which the request was made, or dictate use of the latest revision of the object when more than one object having the same identity exists on the computer system.

According to other aspects of the invention described above, the underlying program is freed from responsibility for efficient operation in a wide variety of difficult to resolve conflicts. Conflict resolution in these matters complicates development and maintenance of such programs. For example, the underlying program that relies on the method described above for returning a reference to an object does not need to determine whether the requested object is shared, determine whether a port exists for object sharing, manage its own network utilization for system level efficiencies, resolve name conflicts when the requested named object exists in several versions throughout the computer system, or permit or facilitate revision of the underlying program to improve system operation. These benefits may permit development and maintenance of fewer versions of the underlying program with further economies of scale.

A memory in another variation according to various aspects of the present invention includes indicia of a method for installing an application program on a workstation. Such a method includes the following steps in any order: (a) installing a naming service on the workstation; (b) forming a registry for use by the naming service, the registry including an object identifier and a policy; and (c) installing the application program for execution at least in part on the workstation so that the application program makes a request to the naming service to obtain the object reference in accordance with the policy. The policy governs selection between indicia of a first object that would, if selected, execute on the workstation and indicia of a second object that would, if selected execute on a different workstation.

By installing the application program on the workstation in the manner described above, the application program may be delivered without all of its component members. These omitted components may be requested using the naming service and coupled to the application program for use by the application program as shared objects. By referring to the policy, these shared objects may include objects able to be activated on the same workstation that the application program is being installed upon, or objects able to be activated on remote portions of a computer system of which the workstation is a part. Further, by separating the policy from the application program, an originally suggested policy may be overridden by a current or future policy set by a system manager as opposed to being specified by the developer or the maintainer of the application program.

A data structure according to various aspects of the present invention includes an object identifier and a policy for determining whether an object reference is to be returned in response to a request. Such a request includes a second object identifier corresponding to the object identifier found in the data structure.

By including the policy in the data structure, as opposed to implementing the policy as design assumptions in the application program that would be requesting the object, revision of the policy is greatly simplified. Further, when a large number of data structures of the type described above exist on a computer system, revisions of such data structures for consistency and for efficient operation of the computer system may be made with far less effort than revising the implementations of such policies in the many services able to be activated on the computer system.

BRIEF DESCRIPTION OF THE DRAWING

Embodiments of the present invention will now be further described with reference to the drawing, wherein like designations denote like elements, and:

FIG. 6 is a data structure diagram of a portion of the preferential naming system registry of FIG. 2;

DETAILED DESCRIPTION OF PREFERRED EMBODIMENTS

Figure 1:
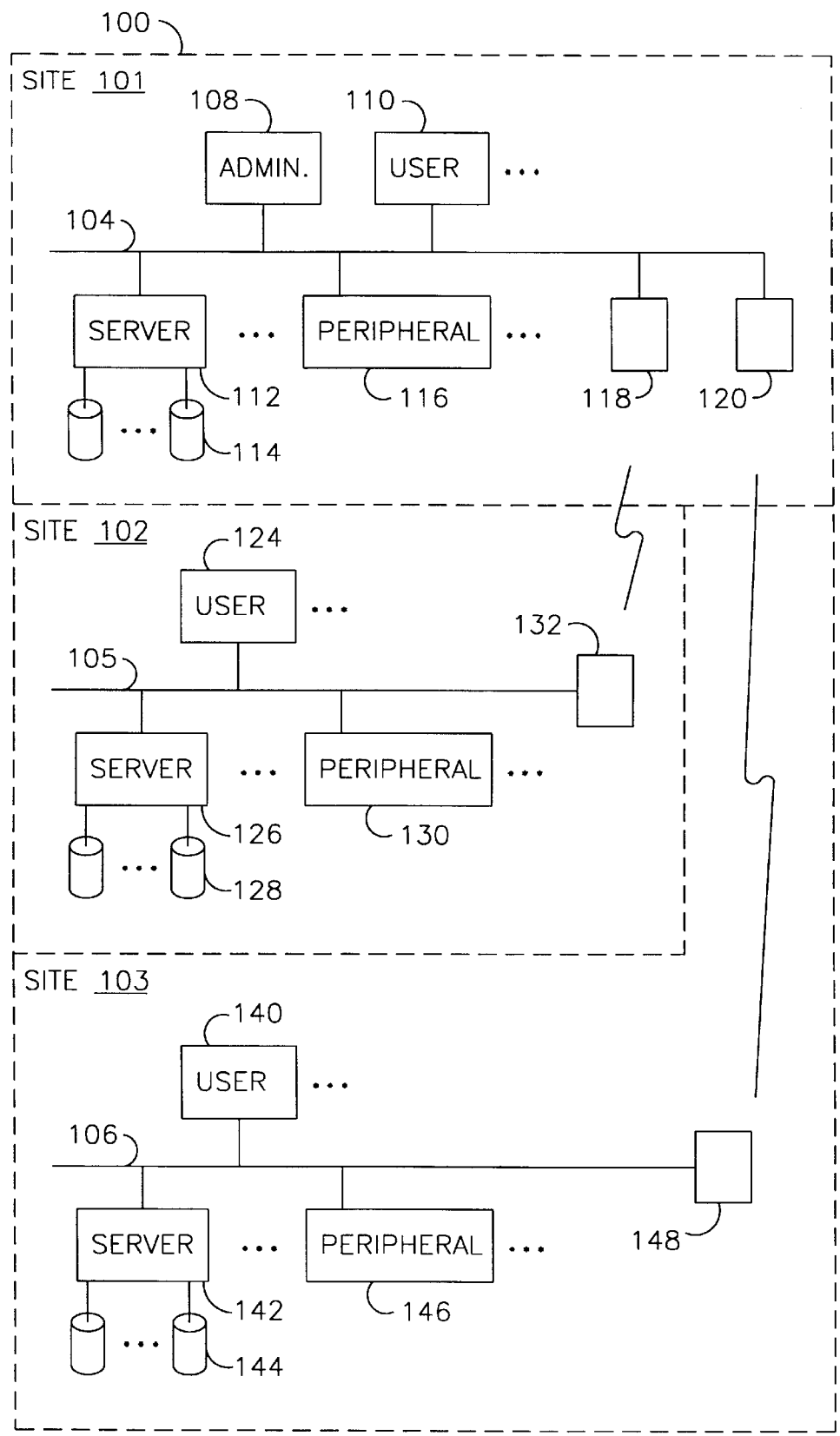
FIG. 1 is a functional block diagram of a computer system according to various aspects of the present invention.

Office computer systems ordinarily include a computer network that couples several workstation computers together with shared peripheral equipment. Sharing of files and objects is supported by computers called servers. A server includes any computer that provides moderated access to a shared resource. A server may have little or no data storage capability; or, as is more common, may have any number of high capacity data storage devices, such as nonvolatile disk systems. Each workstation computer and each server computer executes a program called an operating system. Services performed by an operating system include services that permit access to information, services, and peripheral equipment. The sharing of information and services is simplified when users and user application programs are permitted access for sharing without having to specify the physical path or device name associated with the requested information. Information being requested may include, for example: information from a member program of a distributed application program or information for sharing an object. Further simplification is obtained, as computers are coupled by networks, when users are permitted access for sharing the resources, peripherals, information, objects, member programs, and services that may be local to other computers or local to other computer subnetworks.

A computer system according to various aspects of the present invention, includes any single computer or any network of computers on which shared objects are activated and executed. Such a computer system may include an operating system and services of the present invention that coordinate communication between objects. The hardware and software components of such a computer system (in any combination suitable for a desired initial cost and operating efficiency) are made in accordance with conventional techniques, except as described below.

The term "object" as used herein connotes a broad spectrum of data structures and methods associated with the field of object-oriented programming. Various object-oriented methodologies of computer program development give additional meaning to the term "object"; and, various specific computer programming languages give concrete definition to the term "object." Though these concrete definitions vary, an object generally includes an encapsulation of (a) a behavior (i.e., the way an object functions) as defined in one or more methods which can be invoked externally to the object and (b) a state which remembers the effect of the performance of the methods. A method includes any set of services and/or operations. An operation is defined to include any service that can be requested. A state includes stored data such as a data structure or, when the object encapsulates a large amount of data, a data base. Further, the state of several objects may be stored in one or more records of a suitable data base.

The services for communication between objects generally include a naming service. A naming service may respond to requests from other objects or other services (including an operating system) to provide an object reference for the object identified in the request. A naming service includes any service that provides an object reference in response to a request containing an object identifier. An object identifier includes any object name or identification code. An object reference includes any information sufficient for sending a message to the object that is identified by an object identifier. A message containing an object identifier may be sent to a service for activating the identified object; and, such a service will provide an object reference for further communication with the activated object.

For example, computer system 100, of FIG. 1, includes a computer network linking equipment at three sites. Separate sites refer to separate buildings, geographic areas, or regions separated by distance, logical boundaries, or physical boundaries. Each site includes a subnetwork, namely, 104, 105, and 106 respectively, coupled by signals that cross site boundaries. Note that each subnetwork 104 through 106 may have multiple servers.

Site 101 includes administrative workstation (or console) 108, user workstations shown generally as 110, server 112 having disk systems shown generally as 114, other peripherals shown generally as 116, and couplers 118 and 120. Site 102 includes user workstations 124 (which may be identical to user workstations 110), server 126 having disk systems 128 (which may have identical capabilities to server 112 and disks 114), peripherals 130, and coupler 132. Site 103 includes user workstations 140 (which may be identical to user workstations 110), server 142 having disk system 144 (which may have identical capabilities to server 112 and disks 114), peripherals 146, and coupler 148.

Each user workstation 108, 110, 124, and 140 may include any conventional computer, for example a desk top computer, having any suitable network interface to couple the workstation independently to a subnetwork. A user workstation may include local nonvolatile memory (disk systems), keyboard, and a display device. Each user workstation includes a suitable operating system, for example LINUX (a trademark owned by Linus Torvald) marketed, for example, by Red Hat Software, Inc. Administrative console 108 includes a graphical user interface (GUI) and permits revision of policies of the present invention to be discussed below, for example, with reference to FIG. 3. User workstations and servers perform distributed application programs and services that cooperate with a naming service as discussed below, for example, with reference to FIG. 2.

Each server 112, 126, and 142 may include any conventional server computer system that includes a suitable operating system and any network interface to couple the server to a subnetwork. For example, each server of computer system 100 includes a suitable operating system, for example LINUX, as discussed above.

A server includes a workstation having primary responsibility for executing one or more services. A server may differ from a user workstation in that a server may have hardware and software resources beyond those of a common user workstation particularly suitable for efficiently executing the service(s) for which it is responsible.

Peripherals 116, 130, and 146 may include any conventional devices including general purpose input/output devices (e.g., scanners and printers) and/or special purpose input/output devices (e.g., instrumentation and controllers).

A computer network as in computer system 100 is made up of network links that are dedicated or temporary. A network link includes any data communication mechanism (hardware plus software) that permits cooperation of subnetworks, servers, user workstations, peripherals, and combinations of these devices. For example, couplers 118, 132, and 120, 148 cooperate as pairs to couple subnetwork 105 to 104 and 106 to 104, respectively. These couplers may include any suitable conventional devices including, for example, telephone line modems, satellite link equipment, wide area network repeaters, routers, etc. Subnetworks 104–106 cooperate as a local area network, a wide area network, an intranet, or a network compatible with the Internet.

Figure 2:
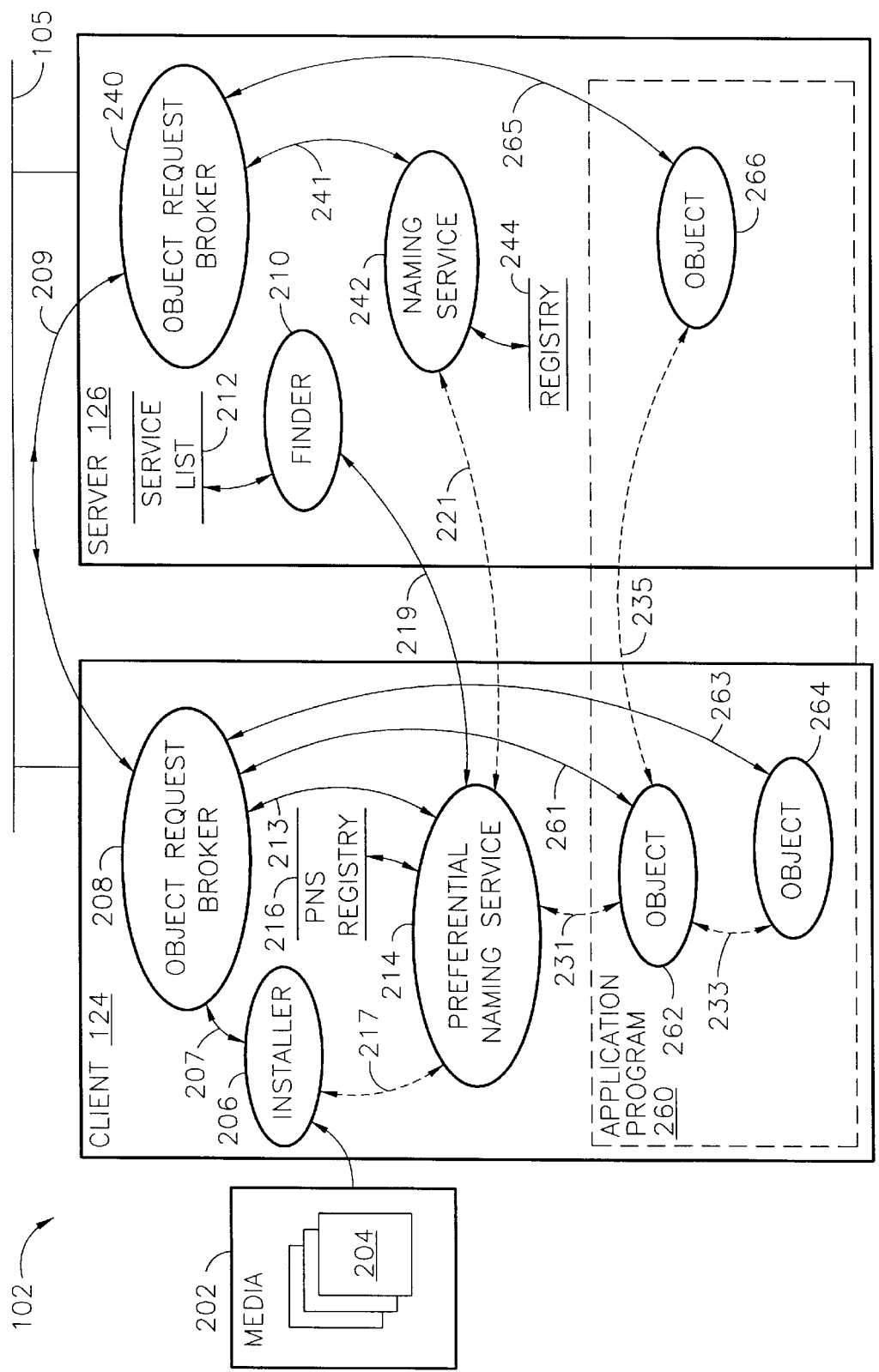
FIG. 2 is a data flow diagram of objects, services, and an application program operating on a portion of the computer system of FIG. 1.

The installation and cooperation of objects activated on computer system 100 according to various aspects of the present invention may be better understood with reference to the data flow diagram of FIG. 2. A portion of site 102 is shown in FIG. 2 including client (i.e., user workstation) 124, server 126, and subnetwork 105 which couples client 124 with server 126 for communication. During installation and execution of a new service on client 124 at the instant of time described by FIG. 2, client 124 may include installer 206, object request broker (ORB) 208, preferential naming service (PNS) 214, and a portion of application program 260 including objects 262 and 264. During the same period, server 126 may include ORB 240, finder 210, service list 212, naming service 242, registry 244, and a portion of application program 260 including object 266.

An object request broker (ORB), according to various aspects of the present invention, includes any object (or set of objects) that manages interobject communication. Such conventional communication may include (a) a remote procedure call, in which the sending object ceases execution (blocks) until it receives a response, (b) synchronous message passing in which the sender blocks until it receives an acknowledgment, and/or (c) asynchronous message passing in which the sender continues execution immediately after sending a message. The ORB may also manage conventional parameter passing semantics, for example, call-by-value, call-by reference, call-by-capability, call-by-proxy, call-by-move, or call-by-copy. These semantics generally require identification of another object using an object reference, for example, assigned by any activating service such as a suitable ORB.

Any of several conventional ORBs may be used in computer system 100. For example, ORBs 208 and 240 may be of the type described by the Common Object Request Broker Architecture (CORBA) or the Distributed Common Object Model (DCOM). CORBA is a standard from The Object Management Group (OMG) for communicating between distributed objects. The concept behind CORBA is to provide a standard way to execute program modules in a distributed environment no matter what language the routines are written in or what platform (type of computer workstation) they reside on. CORBA enables complex systems to be built across an entire enterprise. For example, three-tier client/server applications can be constructed using CORBA-compliant ORBs. CORBA is suited for widely disbursed networks, where an event occurring in one location requires services to be performed in another. DCOM compliant ORBs are generally available from Microsoft, Inc. When a variety of ORBs are used, an ORB gateway (or bridge) may be included in computer system 100 to manage translation of communications and operations between ORBs of different types.

ORB 208 receives requests from and provides responses to several objects and services including: installer 206 via link 207; PNS 214 via link 213; object 262 via link 261; and object 264 via link 263. ORB 240 receives requests from and provides responses to several objects and services including: naming service 242 via link 241; and object 266 via link 265. In effect, communication between objects and/or services logically couples the objects themselves by a virtual link, though all actual messages are handled through one or more ORBs via the links listed above. For example, when communication has been established by ORB 208 and ORB 240 via messages on suitable links discussed above and via link 209 on network 105, a virtual connection exists between objects and/or services shown as a dashed line as follows: virtual link 217 between installer 206 and PNS 214; virtual link 231 between PNS 214 and object 262; virtual link 233 between object 262 and object 264; and virtual link 235 between object 262 and object 266.

An installer, according to various aspects of the present invention, includes any service that transfers files (for example, including program and/or data files) from media (or from a network, such as in downloading from an Internet web site) for operation on a workstation. An installer may use or include a graphical user interface for advising and/or gaining assistance from a system operator or a workstation user.

In a variation, an installer additionally has the conventional capability to transfer files (for example, including program files) to any destination node of a network and to invoke program execution of such transferred programs. Remote program execution may be invoked in cooperation with an alternate ORB and/or alternate operating system on the destination node.

In the example of FIG. 2, installer 206 installs application program 260 on client 124 so that application program 260 is operational with object 264 and object 266. Each object 264 and 266 existed at client 124 prior to installation. The ability to use suitable existing objects reduces the cost and may improve the reliability of the installation.

Generally, installer 206 reads files 204 from media 202, obtains configuration information from the user of client 124, and obtains information from the operating system on client 124. Installer 206 then acts on such information to copy files to memory of client 124, revise file contents, and invoke operation of objects and services on client 124 and server 126. A method of installation performed by installer 206 is described below with reference to FIG. 3.

A preferential naming service (PNS), according to various aspects of the present invention, includes any set of objects that provide a reference in accordance with a policy and in response to a request containing an object identifier whose object reference is desired. For example, when PNS 214 receives a request with an object name, it may retrieve one or more records from a PNS registry indexed by object name. When more than one candidate object is identified by the name, PNS 214 expresses a preference by determining an appropriate policy to follow for the current request, applying the policy to determine an object reference, and returning the object reference.

An object identifier includes any suitable value having a predetermined association with the function(s) to be performed by the desired object. Such an identifier may include a conventional name (e.g., a string value), a substitute for a name (e.g., a code, a partial or complete file system path name, a partial or complete network address, or a partial or complete naming service path name), and/or any conventional information in addition, such as a signature or version. The signature of an object may include the number, order, and types of input, output, and input/output parameters, and/or a return value type. The version may serve to distinguish objects of the same name having the same or different signatures.

A policy, according to various aspects of the present invention includes any data or object read or otherwise accessed by a preferential naming service (PNS) that governs selection between indicia of various objects to provide an object reference. Indicia of an object may include any data or method that when interpreted or executed identifies an object partially or completely. A few examples of indicia of an object include: an object reference; an object identifier; an identifier of a data structure containing indicia of an object; a call (i.e., a message sent) to an activation service (i.e., a factory) that provides an object reference on successful activation; a search criteria and a search method (which may be implied by context) that together indirectly identify an object identifier; or an identifier (e.g., a path) for use with a naming service.

For example, a policy in one variation is implemented as a value from a predetermined set of coded values. PNS 214 reads such a coded value and decodes it in any conventional manner including, for example, a branch table, a vector table, and/or nested conditional statements, to name a few techniques. In a preferred variation, a policy is indicated by one value of a simple set of coded values that relate to location criteria: 0 for local-only, 1 for local-preferred, 2 for remote-only, and 3 for remote-preferred. Local only means that if an object, as identified in the respective request, cannot be activated on the workstation originating the request (i.e., a local object), then no object reference is provided. Remote-only means that if an object, as identified in the respective request cannot be activated (or found to be active) on a workstation different from the workstation that originated the request (i.e., a remote object), then no object reference is provided. Local-preferred means that if an object reference of a local object cannot be provided, operation will proceed as if the policy was remote-only. Finally, remote-preferred means that if an object reference of a remote object cannot be provided, operation will proceed as if the policy was local-only.

In variations, a policy may relate to several criteria. For example, in one variation, location criteria as discussed above is combined with version criteria. When each object has an associated indicator of its version (e.g., build number, release date and time, revision level, etc.), a version criteria may specify, for example, use-exact or use-latest. Use-exact means that if an object of the exact version cannot be activated (of found to be active), then no object reference is provided. Use-latest means that if no object equal to the version specified nor more up-to-date than the version specified can be activated (or found to be active), then no object reference is provided.

In yet another variation, an intermediate object may provide a policy as a data structure for each candidate object as described above further relating to a current estimate of the system level cost of using the respective candidate object.

PNS 214 may determine an object reference to be returned in accordance with the policy by considering individual criteria of the request in a prioritized sequence until one candidate remains. For example, for candidates that satisfy the requested object identifier, version may be considered first, then location, then minimum system level cost. Alternatively, to determine the selected object reference, all criteria may be graded together by any conventional decision making technology (e.g., a weighted sum, a power series, random selection, or load leveling).

A PNS registry, according to various aspects of the present invention, includes any memory containing an object identifier and an associated policy. For example, PNS registry 216 includes a database having a file of records and an index file according to any conventional database technology. Each record contains a policy (or parameters for an intermediate object) as discussed above. The index provides access to one record corresponding to the respective object identifier. The association is one-to-one with object identifier being unique to the registry as a whole.

Several variations of the PNS registry organization are feasible. For instance, the index file, discussed above may be omitted. In one variation, multiple identical object identifiers are permitted to exist in the registry and the same policy is associated with each respective object identifier for effectively a one-to-one association. In another variation, the registry includes, for each object identifier, a version indicator; and, a policy may be associated with each combination of object identifier and version indicator. In such a variation different policies may be registered for different versions of the same object identifier. In yet another variation, records are posted to the PNS registry in alphanumeric order by object identifier and/or version indicator; and, a search engine provides access to the policy corresponding to one or more records that match the search criteria. Search criteria may include any information from a request, information implied by the request, current information, and default information. Such a search engine may use a sequential (and/or a binary) trial and error technique. In still another variation, records of a PNS registry are linked to other records to form a graph or tree. Access to a policy, given an object identifier, may further require given (or default) scope criteria defining a scope of the graph to be searched for candidate records. Such scope criteria may include one or more identifiers of position (graph node) in the tree and may include an indication of whether siblings, decedents of one or more levels, and/or parentage are to be considered within the scope of the graph to be selected.

An application program to be installed in accordance with various aspects of the present invention, includes any set of program files that make reference to a preferential naming service during execution. A program file may be any source or object file including, for example, a source file for interpretation, a source file for execution by a virtual machine, a source file for compilation, a parameter file to be read during program execution, an executable file for dynamic link and load, or an executable file in linked form for immediate execution. An application program may include a distributed application program as discussed above.

For example, application program 260 includes an executable file which, upon execution by client 124, results in the instantiation of object 262. Object 262, in the example of FIG. 2, was developed on the assumption that communication would be established with two other objects by sending to a preferential naming service respective requests naming each desired object.

An application program, according to various aspects of the present invention, may be developed without reference to a predetermined strategy for interobject communication. A strategy includes preferences, for example of the developer, that relate to selecting an object reference when multiple object references are available for a desired object. In a conventional application program, such preferences may be buried in the logic or data used by the conventional application program. In an application program according to various aspects of the present invention however, such a strategy is reflected in a file or files that may be maintained independently of the installed application program files.

A finding service, according to various aspects of the present invention, includes any service that provides an object reference in response to a request containing an object identifier. When PNS 214 sends to finder 210 (a finding service) a request containing an object identifier of a desired naming service, finder 210 retrieves the record from service list 212 that corresponds to the object identifier and provides the associated object reference and may provide other properties of the associated object. For example, PNS 214 may obtain the object reference for naming service 242 and further may obtain the type of naming service for naming service 242, such as CORBA compliant, DCOM compliant (defined by Microsoft, Inc.), etc. The type of naming service determines in PNS 214 how to communicate using the object reference provided by finder 210.

In a variation, a finding service includes the capability to discover services of the type listed in service list 212 (or of a default type or types) that have been added to system 100. Conventional broadcast or "ping" message techniques may be used.

A preferential naming service communicates with a finding service in any conventional manner based on knowledge of properties of the finding service as installed. For example, PNS 214 may be programmed or may have access to data that describe how to communicate with finder 210 via conventional remote procedure calls (RPC) or operating system calls. Such communication is shown in FIG. 2 as link 219.

A service list, according to various aspects of the present invention, includes any memory providing access to object references. When organized as a list of structures or records each structure or record may include an object identifier and an object reference. For example, service list 212, includes a file of records and an index according to any conventional database technology. Each record contains a reference as discussed above. The index provides access to one or more records corresponding to an identifier of the requested service. In variations, service list 212 is organized in any manner discussed above with reference to PNS registry 216 with suitable functional variations for finder 210.

As illustrated in FIG. 2, server 126 may include a naming service and registry that are distinct from PNS 214 and PNS registry 216. Such a naming service cooperates with ORB 240 to respond to each request for an object reference corresponding to an object identifier provided in the respective request. For example, naming service 242 may be any conventional naming service (including a CORBA compliant standard naming service) or a second instance of a preferential naming service.

Naming service 242 establishes and maintains registry 244 in any suitable manner. For example, registry 244 may include a file of records and an index according to any conventional database technology. Each record may include an object reference, as discussed above. The index provides access to one or more records corresponding to the object identifier of the request.

PNS 214 establishes communication with naming service 242 by presenting to ORB 208 the object reference that PNS 214 obtained from finder 210, as discussed above. ORB 208 establishes virtual link 221 in any conventional manner. PNS 214, having been written with knowledge of the structure and operation of naming service 242, may thereafter make a request to naming service 242 containing an object identifier and be provided in response an object reference from registry 244 by naming service 242.

In operation, computer system 100 executes an operating system, one or more services, and one or more application programs to perform various methods of the present invention. An application program may include several objects and one or more services that cooperate on one or more network nodes. Generally, a service may include one or more objects, all of which cooperate on a single network node. In particular, portions of computer system 100 perform (a) a method of application program installation, (b) a method of establishing a link to an object, and (c) a method of providing a reference to an object in response to a request.

Figure 3:
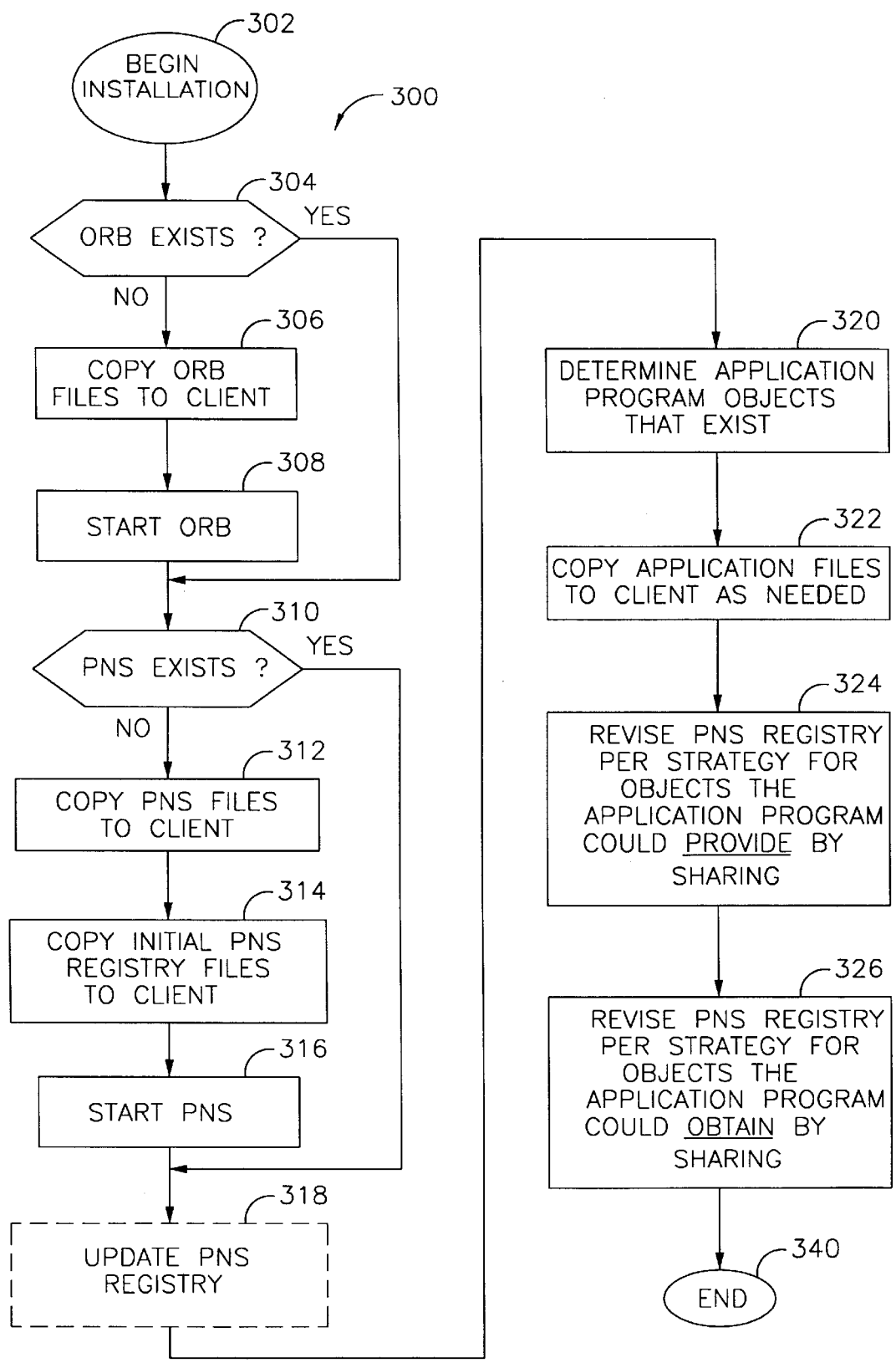
FIG. 3 is a process flow diagram of a method for installing a new application program on the computer system of FIG. 1.

A method of application program installation, according to various aspects of the present invention, includes any method that responds to a request by providing a response in accordance with a policy, the request being for an object reference. For example, method 300 of FIG. 3 is performed by installer 206 for the installation of application program 260. Installer 206 obtains control from the operating system of client 124 in any conventional manner, for example, as a consequence of a command from a user.

Prior to installer 206 obtaining control, all objects of server 126 and only object 264 of client 124 were installed by a prior installation process. Media 202 is read by the operating system of client 124 to load one or more of files 204 and invoke execution of installer 206. On execution of installer 206 on client 124, performance of method 300 commences with step 304.

At step 304, it is determined whether ORB 208 has been installed on client 124. Such a determination can be made in any conventional manner because, installer 206 is developed with knowledge of one or more identifiable characteristics of a client workstation on which ORB 208 may have been installed. For example, if ORB 208 is ordinarily installed in a particular directory of a file system or in a particular memory of client 124, then installer 206 may test this file system or memory for values that identify an installed ORB. If ORB 208 has been installed, control passes to step 310. Otherwise, control passes to step 306.

At step 306, ORB files of files 204 are copied to client 124. Contents of the copied files and/or other files on client 124 may be revised in a conventional manner so that ORB 208 responds to PNS 214 and to application program 260.

At step 308, ORB 208 is started and executes on client 124 as one or more tasks in the multitasking environment provided by the operating system on client 124. In a variation, ORB 208 is implemented as a run time library, called as needed by PNS 214 and by application program 260 without ORB 208 existing as a separate task.

At step 310, it is determined whether PNS 214 has been installed on client 124. Such a determination can be made in any conventional manner because, installer 206 is developed with knowledge of one or more identifiable characteristics of a client workstation on which PNS 214 may have been installed. For example, if PNS 214 is ordinarily installed in a particular directory of a file system or in a particular memory of client 124, then installer 206 may test this file system or memory for values that identify an installed PNS. If installer 206 identifies PNS 214 as having been installed, control passes to step 318. Otherwise, control passes to step 312.

At step 312, PNS files of files 204 are copied to client 124. At step 314, additional files of files 204 constituting an initial PNS registry 216 are copied to client 124. Contents of the copied files and/or other files on client 124 (e.g., .INI files) may be revised in a conventional manner so that PNS 214 cooperates with PNS registry 216, ORB 208, and application program 260.

At step 316, PNS 214 is started and executes on client 124 as one or more tasks in the multitasking environment provided by the operating system on client 124.

At step 318, PNS 214 is enabled to update PNS registry 216. This update operation may result in the inclusion of one or more object identifiers for objects local to client 124; and, may result in the inclusion of one or more object identifiers for objects remote from client 124. To simplify development and maintenance of the installer, step 318 is performed by PNS 214 instead of installer 206 in a preferred variation. Completion of this step may be a prerequisite for performance of step 320, implemented as discussed below. When PNS 214 is started in step 316, PNS 214 reads one or more files 204 to obtain a description of object identifiers that the developer of media 202 could reasonably expect to already exist locally or remotely and which might be considered a core competency of the preferential naming service. These object identifiers may identify operating system objects, shareable objects of PNS 214, shareable objects of common application programs that may have already been installed on client 124, and may further identify any objects known by any other naming service of system 100. This description of object identifiers specifies a delivered object sharing strategy as originally distributed on media 202. The delivered strategy implements choices made by the developer or distributor of application program 260 and/or media 202.

In a variation, installer 206 includes operations for revising such a delivered strategy to conform to choices made (or to be made) by a system manager of computer system 100, a site manager of site 102, and/or a user of application program 260. Contents of PNS registry 216 before, during, or after step 318 may be used or presented for comparison in revising the delivered strategy. When revisions are made to develop a new strategy, consistency checking, anomaly correction, and possibly repetitive performance of steps 318 through 326 by PNS 214 and installer 206 may follow.

At step 318 PNS 214 reads each object identifier from the description and makes a suitable entry in PNS registry 216. The description may have any suitable structure for data and for interpretable or executable instructions (if any). In one variation, the description includes a file of data records similar to the structure of PNS registry 216, for example, describing folder nodes and leaf nodes of a tree structure to be grafted (or conditionally grafted) onto a node of the tree structure registry formed at step 314 and as discussed above. In another variation, the description includes a file containing objects (or classes of objects) useful in the performance of step 318, script and/or macro commands to be interpreted during step 318.

In a variation an entry in PNS registry 216 is not made when an object corresponding to the object identifier is not found to be active or cannot be activated without error. Any suitable method may be used to determine if an object corresponding to an object identifier is active or can be activated locally on client 124. For example, information sufficient to activate an object may be found via an operating system call, in a file maintained by the operating system, in a file system at a predetermined location, or in response to a predetermined application program interface function common to one or more of the shared objects.

Objects that are active or can be activated on a remote workstation, such as object 266 on server 126, may be found as discussed above with reference to finder 210 and naming service 242.

Installation may require an unacceptable delay when performance of step 318 includes updates for many object identifiers. When PNS registry 216 is to be updated with information related to many remote objects, delay may be accompanied by considerable expenditure of network resources. In a variation, these updates are scheduled to occur over a period of time or are scheduled to be accomplished on an as needed basis.

In a preferred variation, PNS registry 216 is organized as a tree as discussed above. PNS 214 includes tree modification functions in its application program interface. For example, installer 206 may make one or more calls to PNS 214 for registry maintenance operations including (a) adding a node to the root or to another node of the existing tree; (b) grafting a descendent tree (i.e., subtree) to an existing folder node; (c) removing an existing leaf node from the tree to discard it; or (d) removing an existing folder node from the tree to discard it and all its descendent nodes.

At step 320, installer 206 presents requests to PNS 214 for each object of application program 260. For those objects that exist and meet the initial policy stated in the initial PNS registry 216, installer 206 receives an object reference. For example, if object 262 has already been installed on client 124 and permits local use, that part of media 202 for object 262 is not needed in the present installation. Further, if object 266 has been installed on server 126 and permits remote use, that part of media 202 to object 266 is not needed in the present installation.

At step 322, for objects of application 260 that are not found according to the delivered (or revised) object sharing strategy, files of files 204 are copied to client 126.

At step 324, installer 206 directs PNS 214 to make an entry in PNS registry 216 for each object that provides an operation of application program 260. These objects form an application program interface (API) for application program 260.

At step 326, installer 206 directs PNS 214 to make an entry in PNS registry 216 for each object that application program 260 could obtain by sharing. For example, if the delivered object sharing strategy (or a revised strategy) could refer to one or more remote objects, installer 206 may direct PNS 214 to attempt to locate suitable local and/or remote objects. The scope of the attempt at step 326 may differ from the scope of the attempt to locate suitable objects in step 320. For example, step 320 may be limited to local objects. However, to give effect to all policies of PNS registry 216, step 326 may include an exhaustive search for remote objects, including objects located with the assistance of finder 210 and one or more naming services of service list 212. In a variation, PNS 214 executes step 326 periodically to give effect to changes in system 100, service list 212, and subsequent installations of other distributed application programs.

Installation is then complete at step 340.

Note that when a number of local and remote objects can be found, the extent of files 204 on media 202 may be reduced, thereby reducing distribution expense and installation time.

A method of establishing a link to an object, according to various aspects of the present invention, includes any method that directs a request to a preferential naming service (PNS) for obtaining an object reference. Such a method is performed by a "client object" (herein called the requester) in its attempt to gain access to functions or data of a "server object." The descriptive titles "client object" and "server object" indicate the role each object plays in the message exchange of the request to a PNS. Of course, these roles may later be reversed, for example, when the "server object" responds with its own request for the reference of the "client object." Note also that client 124 and server 126 do not by their titles imply any restriction on the roles played by objects operating on each.

Figure 4:
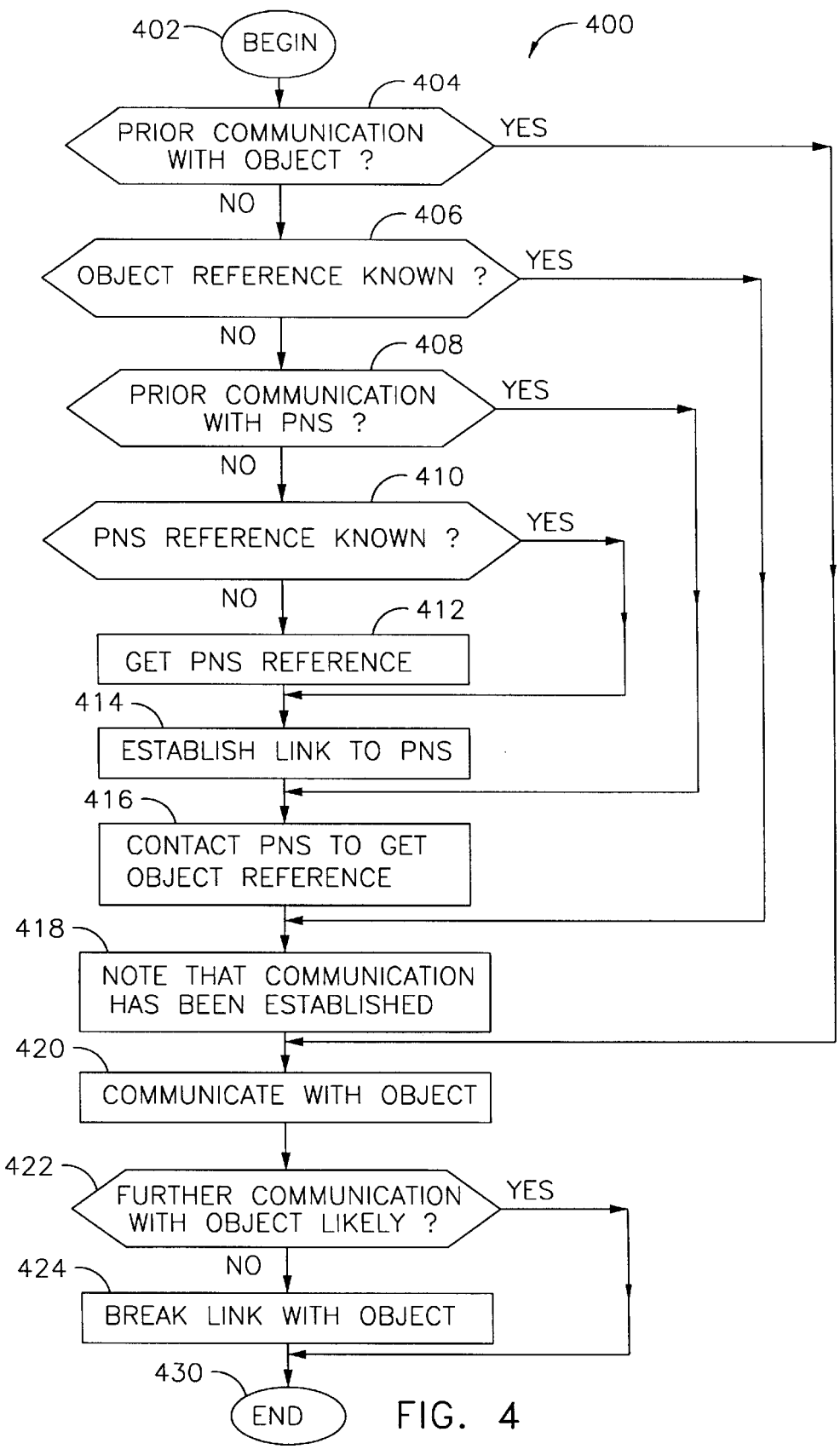
FIG. 4 is a process flow diagram of a method for sharing an object, the method being performed by a requesting object of FIG. 2.

Such a method in one variation may be better understood with reference to an example performed by objects shown in FIG. 2. In an exemplary scenario for illustrating the performance of method 400 of FIG. 4, object 262 has made a first request for an object reference of object 266. In responding to the first request, PNS 214 (a) determined from PNS registry 216 that both object 264 and object 266 match the requested object identifier, (b) determined that the policy to apply dictated a preference for a remote object (i.e., object 264 is a local object because it executes on the same workstation 124 as the requester 262 and object 266 is a remote object because it executes on a different workstation), (c) determined that the object reference of object 266 was viable, and (d) provided the object reference of object 266 to object 262. Now suppose that communication via virtual link 235 between object 262 and 266 becomes unsatisfactory. This may be evident to object 262 as a time-out error, for example. In response to such a communication failure, object 262 performs method 400 to again obtain the services provided by any object having the name used in the first request. The following paragraphs describe performance of the steps of method 400 in continuing the scenario described above.

At step 404, it is determined whether there has been any prior communication with an object having the name used in the first request. Such a determination is made in any conventional manner, for example by testing a state variable of object 262. If prior communication had been performed, control passes to step 420; and, if not to step 406.

At step 406, it is determined whether object 262 has prior knowledge of an object reference of an object of the desired name. Any conventional test could be used for this determination. For example, if the object reference obtained in response to the first request had been saved in a state variable of object 262, a conventional test of such a state variable would suffice. If an object reference is known, control passes to step 418; and, if not, to step 408.

At step 408, it is determined whether there has been any prior communication with a preferential naming service. Such a determination is made in any conventional manner, for example by testing a state variable of object 262. If prior communication had been performed, control passes to step 416; and, if not to step 410.

At step 410, it is determined whether object 262 has prior knowledge of an object reference to a preferential naming service. Any conventional test could be used for this determination. For example, if the object reference obtained during installation or instantiation of object 262 had been saved in a state variable of object 262, a conventional test of such a state variable would suffice. If an object reference is known, control passes to step 414; and, if not, to step 412.

At step 412, object 262 obtains an object reference of PNS 214 in any conventional manner. For example, because lack of an object reference to PNS 214 is a fundamental failure of the development of application program 260, or of the installation or instantiation of object 262, a critical warning and request for system manager or expert user assistance may be made. If no object reference to PNS 214 can be obtained, method 400 cannot continue. On the other hand when such an object reference is obtained by object 262, control passes to step 414.

At step 414, a virtual link from object 262 to PNS 214 is established in any conventional manner. For example, object 262 may send a message to ORB 208 and expect a reply. Such a message may include the object reference of PNS 214 and an object reference of object 262. The reply may simply confirm that PNS 214 is now activated.

At step 416, object 262 makes a second request of PNS 214. The second request (for purposes of this scenario) includes the same object name as used in the first request. In responding to this second request, PNS 214 (a) determines from PNS registry 216 that both object 264 and object 266 match the requested object identifier, (b) determines that the policy to apply dictates a preference for a remote object, (c) determines that the object 266 is not viable, and (d) provides the object reference of object 264 to object 262. PNS 214 may conclude that object 266 is not viable directly or indirectly. For example, object 262 may report to PNS 214 that operations of object 266 are unsatisfactory. PNS 214 may determine that bus 105 is inoperative based on messages or reports from ORB 208 or ORB 240.

At step 418, object 262 notes that communication has been established with an object having the name as used in the second request. This notation may be made in any conventional manner and may serve the purpose of the test described above with reference to step 404.

At step 420, object 262 communicates with object 264 via virtual link 233 and without knowledge of the location of the requested object. The requested object was provided in accordance with a policy recorded in PNS registry 216.

Generally, the policy for any object identifier recorded in PNS registry 216 may be a policy set by a system manager for efficient operation of computer system 100. This policy may differ from a strategy for object sharing held by the developer when application program 260 or particularly object 262 was being developed. For example, the developer may have held a strategy that the object to be requested be located only on a node remote from client 124 where object 262 is currently executing (i.e., "remote-only"). When a system manager (or installer 206 or PNS 214) determines that a functionally equivalent object (e.g., object 264) is available, the policy in PNS registry 216 as to object references for this requested object identifier may be revised to indicate (a) local only, (b) local-preferred, or (c) remote-preferred as opposed to "remote-only."

At step 422, object 262 determines in any conventional manner whether further communication with object 264 is likely. This determination is based substantially on the program logic of object 262. If further communication is likely, control passes to step 430. Otherwise, control passes to step 424.

At step 424, object 262 may break virtual link 235 in any conventional manner for example for purposes of permitting increased utilization of system 100 by other objects.

At step 430, method 400 is complete.

In a variation of method 400, steps 422 through 424 are omitted. In such a variation, the communications of step 420 may be accomplished by a separate and concurrent task running as needed to support other operations of object 262.

Figure 5:
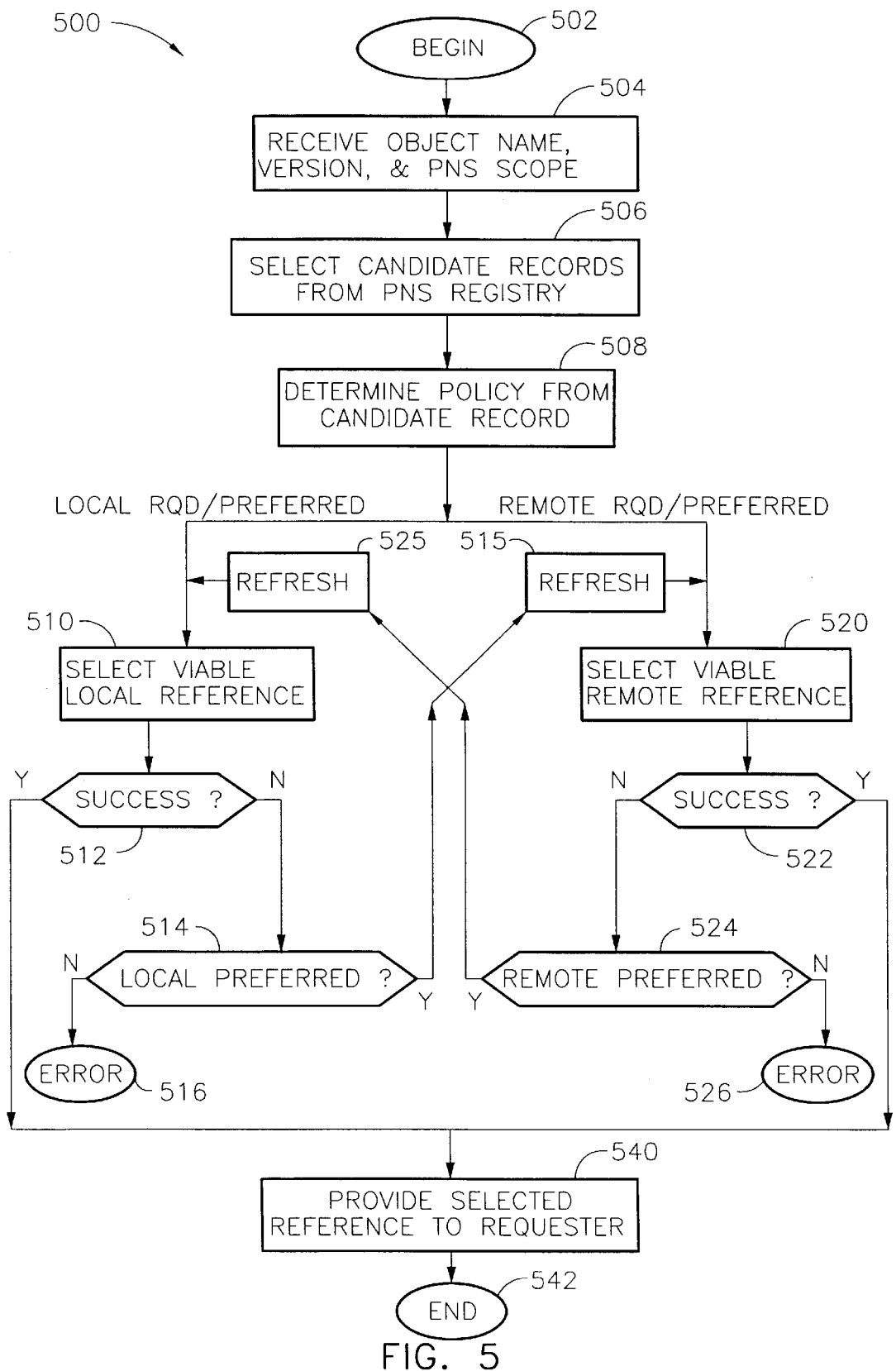
FIG. 5 is a process flow diagram of a method for sharing an object, the method being performed by the preferential naming service of FIG. 2.

A method of providing an object reference of an object in response to a request, according to various aspects of the present invention, includes any method that determines a policy in accordance with an object identifier provided with the request and then provides the object reference in accordance with the policy. For example, method 500 of FIG. 5 may be performed by PNS 214. Method 500 may be better understood from an explanation of several examples that are based upon a particular PNS registry structure and a particular representation of policies to be followed. In variations, method 500 may be used with suitable alternate PNS registry structures and alternate logic for interpreting policy values including alternate procedures for exercising a preference in light of exceptional conditions that apply specifically to that policy. In other words, method 500 as explained below and as shown in FIG. 5 includes logic related to exercising a policy involving object location in light of the exceptional conditions related to object existence at particular locations. In variations, policy values for any other conventional object property may be followed with logic to handle related exceptions.

In the following examples, policy values, as discussed above, are selected from the set of location policy values: (LO) always provide the local reference, i.e., local-only; (LP) provide the local reference, but when the local reference is not available, provide the remote reference, i.e., local-preferred; (RP) provide the remote reference, but when the remote reference is not available, provide the local reference, i.e., remote-preferred; and (RO) always provide the remote reference, i.e., remote-only.

Figure 7:
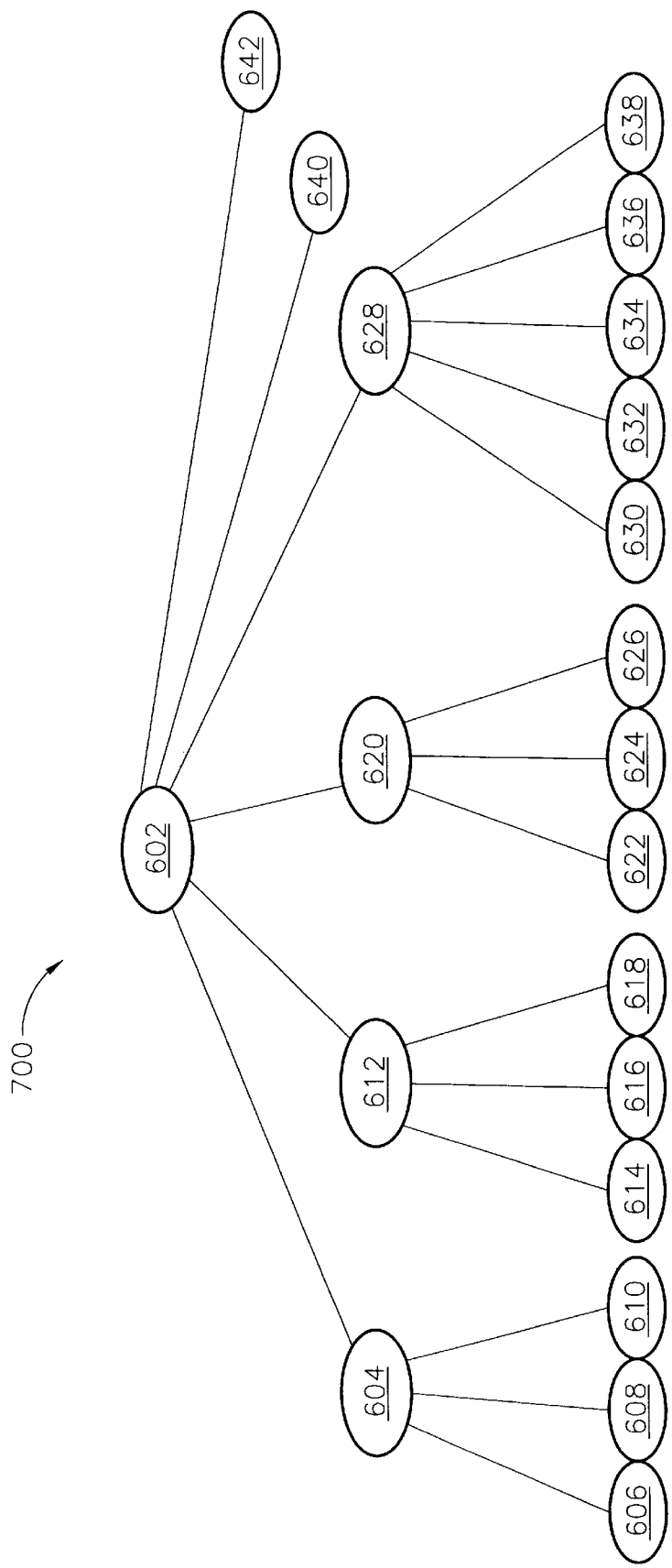
FIG. 7 is a diagram of a tree of data structures of the type described in FIG. 6.
Figure 8:
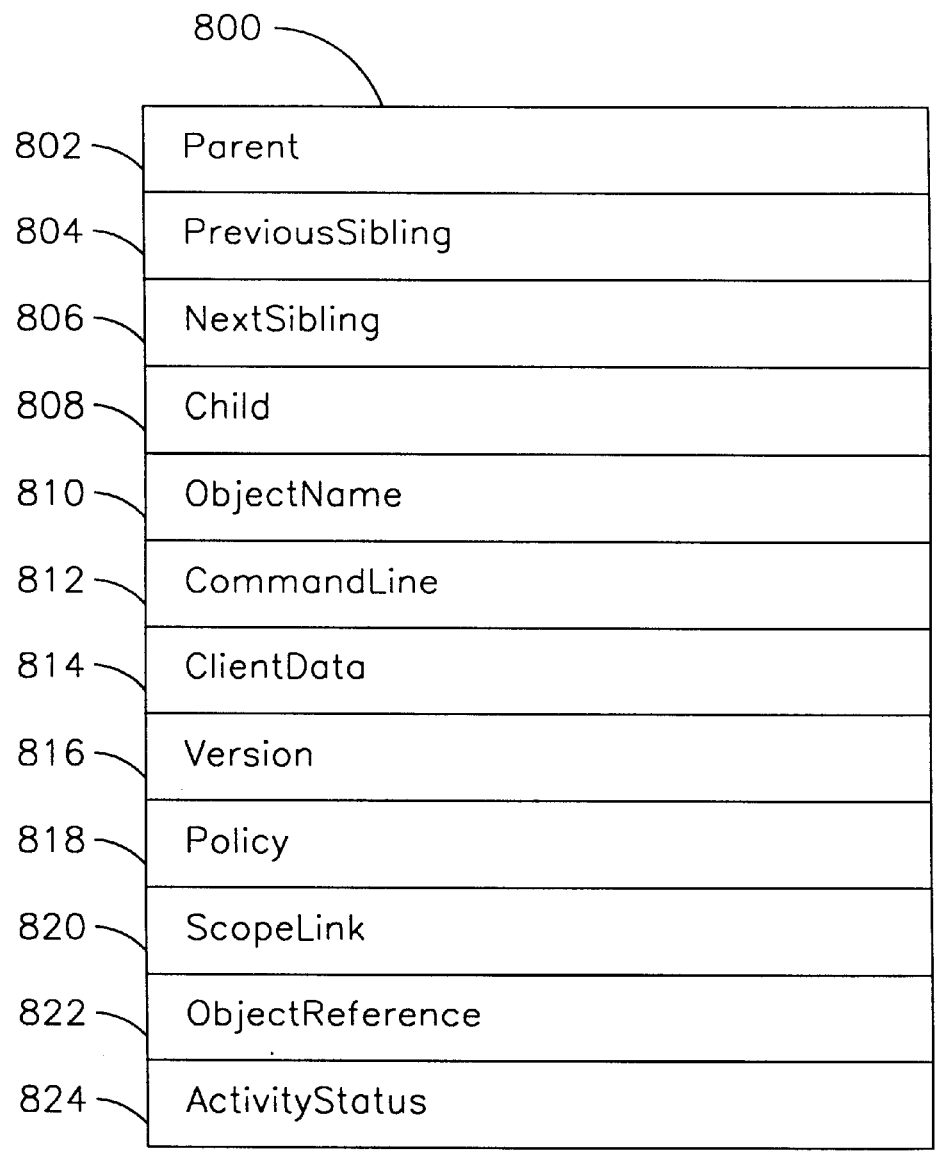
FIG. 8 is a data structure diagram of an entry in the preferential naming system registry of FIG. 2.

In the following examples, PNS registry 216 includes a plurality of records 600 having hierarchical relationships between records illustrated as tree graph 700 of FIG. 7. Each record of the plurality includes a data structure 800 of FIG. 8 that is stored in a memory of client 124 having portions serving the purposes as indicated by named values 802 through 824. Some of these values are shown for convenience of reference in FIG. 6. For example, ObjectName 810 for record 602 is the string "ROOT" and for record 604 is the string "2SHARE", etc. A version designation 816 for some records is given using a capital "V" and an integer as in "V1", "V9", etc. In several records, a respective value for policy 818 is given in parenthesis, e.g., "(LO)" as discussed above. Finally, a value for ScopeLink 820 for some records is given in brackets as a partial naming system path, for example, "[XNS\SHARED]" in record 604 indicates a folder in an external naming system.

Requests received in the examples below are characterized, for convenience of explanation only, as originating from an object of application program 260 on client 124. Specifically, each request originates from object 262 and is communicated to PNS 214 via virtual link 231. Each request includes an object name, a version criteria, and a scope criteria. Version criteria include a coded value from the set: (LV) always use the latest version; (GT), (GE), and (EQ) with respect to a version identified in the request, use any version greater than, greater than or equal to, or equal to, respectively; and (RG) use a version identified by a given string value consisting of a range (or comma separated list) of versions. Note that use of the LV code may invoke an update of PNS registry 216 to confirm that a later version has not become accessible since the last PNS registry update. The scope criteria may identify the scope of search for identifying candidate records.

The operations performed in the examples below presume that PNS registry 216 is completely updated and consistent. In an alternate variation, method 500 is expanded to include the following steps for updating PNS registry 216 in response to requests. When it is determined that the number of existing candidate entries in PNS registry 216 is insufficient, PNS 214 may contact finder 210 via link 219 to determine a current object reference for each service listed in service list 212. For each found naming service reference, such as an object reference of naming service 242, PNS 214 may then (a) for each record in PNS registry 216 that specifies a value of ScopeLink 820, make a request for an object reference corresponding to the respective value of ObjectName 810; and/or (b) for each record in PNS registry 216 that is a folder and specifies a value for ScopeLink 820, make a request for all records in a folder of a remote naming service having a name corresponding to the respective value of ObjectName 810. If after updating PNS registry 216, no candidate exists for a requested object name, PNS 214 may return an error to the requester for conventional error handling by the requester.

EXAMPLE 1

(Local-only)

At step 504, PNS 214 receives a request for any object named "CALC" with a version greater than (GT) 1 that is within the scope of folder "2TEST".

At step 506, a search for candidate records from PNS registry 216 is performed. A record will be considered a candidate when its ObjectName 810 matches "CALC" and its Version 816 satisfies the version criteria. Only records 630 through 638 are considered. Records 636 and 638 satisfy these search criteria.

At step 508, Policy 818 of one of the candidate records is taken as the policy to be followed for this particular request. Generally, the candidate record with the latest version is selected when more than one candidate record has been identified in step 506. Here, selected record 636 has the later version of records 636 and 638. If the determined policy corresponds to local-only or local-preferred, control passes to step 510. If the determined policy corresponds to remote-only or remote-preferred, control passes to step 520. Here, record 636 defines a local-only policy so control passes to step 510.

At step 510, two tests are made using the selected record. First, the selected record must provide sufficient information to reach an object that satisfies the policy. In this case, the object must be local to the requester. Second, the selected record must provide sufficient information to reach a viable object. For the first test, PNS 214 may examine several values to conclude whether the selected record identifies a local object. A record identifies a local object if (a) CommandLine 812 contains a value, or (b) ScopeLink 820 does not contain a value and ObjectReference 822 does contain a value. For the second test, the object identified by the selected record must be active or it must be possible to activate the object in a timely fashion. An object may be considered active as indicated by ActivityStatus 824 or merely when ObjectReference has a suitable value. In testing viability, PNS 214 may examine ActivityStatus 824 which may include sufficient information from prior testing to determine the object's current viability. If ActivityStatus 824 is inconclusive, PNS 214 may activate the object in any conventional manner in accordance with the value of its CommandLine 812. PNS 214 may pass an object reference identifying PNS 214 to the object being activated and start a suitable timer. Upon activation within a suitable allotted time, PNS 214 receives an object reference from the object that was successfully activated.

In a variation, PNS 214 determines viability in any manner with reference to information PNS 214 may obtain from the operating system that controls operation of the object. Such information may allow PNS 214 to (a) perform a load balancing function; (b) avoid providing the object reference of an unsuitable object from a performance standpoint; or (c) provide object references to unique objects for simultaneous parallel execution of same-named objects. After both tests are made, control passes to step 512.

For this discussion, record 636 identifies a local object that is inactive. PNS 214 may successfully activate CALC version V3 as object 264, obtain an object reference from object 264 or ORB 208, store the object reference in ObjectReference 822, and update ActivityStatus 824 of record 636.

When an object reference has been successfully obtained, control passes from step 512 to step 540. If an object reference had not been successfully obtained, control passes to step 514 as discussed below with respect to applying a local-preferred policy. In a variation, control may pass to step 508. In such a variation, for example, when an attempt to activate CALC version V3 failed for lack of sufficient memory on client 124, and additional candidates were identified in step 506, a next candidate is selected at step 508 and its policy is subsequently applied at step 510 or 520 as the case may be.

At step 540, the obtained object reference is provided to the requester in a response message via virtual link 231. Method 500 in this example is complete at step 542.

EXAMPLE 2
(Remote-Only)

At step 504, PNS 214 receives a request for any object named "DISCOVER" with version equal (EQ) 1 that is within the scope of folder "ROOT". The requester expects to obtain the behavior of a conventional discovery operation as discussed above. In practice such a wide scope may include candidates from diverse folders that are functionally different and possibly incompatible with the behavior expected by the requester. For example, 2SHARE folder 604 contains object references intended for wide utilization by diverse objects. However, SLICKR folder 612 and COUNTX folder 620 contain object references originally designed for sharing exclusively among the member programs of each application program respectively (herein arbitrarily named SLICKR and COUNTX). Finally, 2TEST folder 628 may currently contain untested objects whose behavior may be unreliable or uncertified.

The structure of PNS registry 216 permits such wide-scope searches which may be desirable for particular application programs or systems management objectives. In a variation, PNS 214 does not search more than one level beyond the level defined in the scope criteria received in the request. For example, a search from "ROOT" would include only folders for records 604, 612, 620, 628, 640, and 642 as shown in FIG. 6 and not their respective contents. Such a limitation may prevent unexpected records from being considered candidates and prevent extensive searching by PNS 214 to satisfy a single request.

At step 506, only record 608 is selected as a candidate using a procedure for selection as discussed above.

At step 508, remote-only Policy 818 of selected record 608 is taken as the policy to be followed for this particular request. Control passes to step 520 as discussed above.

At step 520, two tests are made using the selected record. First, the selected record must provide sufficient information to reach an object that satisfies the policy. In this case, the object must not be local to the requester. In other words, when the requester and PNS 214 are executing on a first workstation, the object reference must identify an object that is executing on a second workstation. Second, the selected record must provide sufficient information to reach a viable object. For the first test, PNS 214 may examine several values to conclude whether the selected record identifies a remote object. A record may identify a remote object when (a) CommandLine 812 is null, or (b) ScopeLink 820 contains a value identifying a scope criteria with respect to a remote naming service. Whether the workstation that is currently executing a particular active object is the local workstation may be determined by PNS 214 by analysis of ActivityStatus 824 as set when the object was determined to be active. If activation resulted from use of the Command-Line 812 value of any record of PNS registry 216, then the activated object is a local object. For the second test, the object identified by the selected record must be viable. An object may be considered viable as indicated by ActivityStatus 824 or merely when ObjectReference has a suitable value. In testing viability, PNS 214 may (a) assume that the object is active (e.g., because all CORBA objects are expected to be active); (b) request activity status from a remote naming service that provided the object reference; (c) request a new object reference be timely provided by a remote naming service; or (d) use a feature of a remote ORB. PNS 214 may achieve activation of the remote object merely by requesting an object reference from a remote naming service. PNS 214 may pass an object reference identifying PNS 214 to the remote naming service and start a suitable timer. Upon activation within a suitable allotted time, PNS 214 may receive an object reference from the remote naming service.

In a variation, PNS 214 determines viability in any manner with reference to information PNS 214 may obtain from the operating system that controls operation of the remote object or the remote naming service. Such information may allow PNS 214 to perform a load balancing function and/or avoid providing the object reference of an object that is unsuitable from a performance standpoint. In a preferred variation, PNS 214 presumes that if an object reference is defined for a remote object, then the remote object is viable.

For this discussion, record 608 identifies a remote object that is active. Control then passes to step 522.

When an object reference has been successfully obtained, control passes from step 522 to step 540. If an object reference had not been successfully obtained, control passes to step 524 as discussed below with respect to applying a remote-preferred policy. In a variation, control may pass to step 508. In such a variation, for example, when an attempt to activate DISCOVER version V1 failed, and additional candidates were identified in step 506, a next candidate is selected at step 508 and its policy is subsequently applied at step 510 or 520 as the case may be.

For this discussion, record 608 includes an ObjectReference value that passes the viability test discussed above. Because a viable remote object has been identified, control passes from step 522 to step 540 where the ObjectReference value from record 608 is provided to the requester in a response message via virtual link 231. Method 500 in this example is complete at step 542.

EXAMPLE 3
(Local-Preferred)

At step 504, PNS 214 receives a request for any object named "PRINT-DRV" having a version in the range (RG) "1, 3, 4" that is within the scope of folder "COUNTX".

For this discussion, at step 506, one candidate is selected because Version 816 of record 626 is V1. Record 626 identifies a local object based on having a value for CommandLine 812 and identifies a remote object based on having a value for ScopeLink 820 referring to an external naming system (XNS). In addition, ObjectReference 822 is null. In a variation, the possibility of a remote object of the highest requested version is investigated by PNS 214 in a manner as discussed above with reference to finder 210 and naming service 242.

At step 508, a policy is determined from record 626 as local-preferred.

For this discussion, at step 510, a viability test as discussed above fails because activation of PRINT-DRV V1 from CommandLine 812 is not completed within the allotted time.

At step 512, success in identifying an object reference has not been achieved, so control passes to step 514.

At step 514, control passes to step 515 only when the governing policy (as here) is local-preferred. If, for example, the governing policy is remote-preferred, control has passed through steps 508, 520, 522, 524, 525, 510 and 512, and no local object reference was identified by step 510, then control passes to step 516 for an appropriate error handling procedure.

At step 515, a list of one or more remote candidate records may be formed based on the value of ScopeLink 820 of record 626. Here, the value "XNS/PRINTER" may identify a folder of a naming service registry, for example a CORBA naming service or naming service 242 as discussed above. In response to any suitable request made by PNS 214 to a remote naming service, PNS 214 may obtain one or more object references and may obtain or determine in any conventional manner a corresponding version for each object reference. For example, if naming service 242 returns an object identifier as "PRINT-DRV_4", conventional syntax analysis may permit concluding that this identifier refers to PRINT-DRV version 4. PNS 214 may further use the list so obtained to update PNS registry 216. Step 515 provides a more efficient update of PNS registry 216 than a general update (e.g., as in steps 318 or 326) because requests for object references are limited to requests for a given object name (e.g., "PRINT-DRV") and may further be limited by version criteria (e.g., "RG 1, 3, 4"). Delay and network traffic may be reduced by this technique.

Step 520 is then performed as discussed above using the new list of candidates. Generally, in selecting a record from the list obtained as discussed above, preference is extended to the latest version that satisfies the version criteria. Control then passes to step 522.

If a selected remote object is not viable, control passes to step 524. At step 524, the governing policy value of local-preferred does not satisfy the test for remote-preferred and control passes to error handling procedure 526. In a variation, control may pass back to step 515 or to step 508. At step 515, another candidate remote object may be selected from the list as discussed above. At step 508, another candidate record from PNS registry 216 may be selected as discussed above. In the later case, a different policy may be read from the newly selected record and applied at step 510 or 520 as the case may be.

For this discussion, the selected reference is found to be viable at step 520 so control passes from step 522 to step 540 where the respective object reference is provided to the requester as discussed above. Method 500 is then complete at step 542.

EXAMPLE 4
(Remote-Preferred)

At step 504, PNS 214 receives a request for any object named "ANALYZE" of the latest version (LV) that is within the scope of folder "SLICKR".

For this discussion, at step 506, two candidates are identified, namely records 616 and 618. Record 618 is initially selected because its version is later than the version indicated in record 616.

At step 508, a policy indicating remote-preferred is determined from record 618. Control, therefore, passes to step 520.

For this discussion, at step 520, a viability test as discussed above fails because no object reference was returned in the allotted time to PNS 216 in response to its request to the remote naming service specifying an object identifier of ANALYZE, a version criteria of LV, and a scope criteria of XNS/SLICKR.

At step 522, success in identifying an object reference has not been achieved, so control passes to step 524.

At step 524, control passes to step 525 only when the governing policy (as here) is remote-preferred. If, for example, the governing policy is local-preferred, control has passed through steps 508, 510, 512, 514, 515, 520, and 522, and no remote object reference was identified by step 520, then control passes to step 526 for an appropriate error handling procedure.

At step 525, refreshing may be accomplished in an analogous manner as discussed above with reference to steps 320, 326, and 515. For example, PNS 214 may obtain information identifying local objects from the operating system of client 124, from the file system of client 124, and/or from ORB 208. For this discussion, at step 525, a local object reference is obtained from ObjectReference 822 of record 618. When no value is provided for ObjectReference 822, PNS 214 activates a local object based on the value of CommandLine 812 of record 618 as discussed above.

Step 510 is then performed as discussed above. For this discussion, a local object ANALYZE V2 is found to be viable. Note that such a local object may have been active, yet not initially used as the PNS return value to give effect to the remote-preferred policy. Control passes from step 510 to step 512.

If a selected local object is not viable, control passes to step 514. At step 514, the governing policy value of remote-preferred does not satisfy the test for local-preferred and control passes to error handling procedure 516. In a variation, control may pass back to step 508. At step 508 another candidate object may be selected, for example ANALYZE V1 of record 616. The same policy as here, (RP), or a different policy may be read from the newly selected record and applied at step 510 or 520 as the case may be.

For this discussion, the selected local object reference is found to be viable at step 510 so control passes from step 512 to step 540 where the local object reference is provided to the requester as discussed above. Method 500 is then complete at step 542.

As discussed above, a PNS registry, according to aspects of the present invention, may include a data structure that provides convenient access to information related to an object name or reference. For example, In a variation of PNS registry 216 having all functions as already described, PNS registry 216 further includes any data structure that expresses any hierarchical relationships among object names. A hierarchical relationship may permit efficient grouping of related information and efficient handling (e.g., deleting, copying, or moving) of multiple records. Further, a hierarchical relationship may permit efficiencies in expressing various policies, and/or various methods of accessing records to be considered candidates from which a selected reference is to be identified.

For example, hierarchy 600 of FIG. 6 may be implemented in PNS registry 216 by a data structure according to various aspects of the present invention. Hierarchy 600 may be implemented using any conventional technique, such as, a graph, a tree, a directory, a database, or a multiply linked list. Hierarchy 600 includes in each record (602 through 638) information identifying a folder, or information identifying a data structure that is a member of a folder. Information identifying a folder may include any arbitrary or unique folder designation.

As illustrated, all object names associated with the same folder are listed at a common indenture under the folder name. For example, records 604, 612, 620, 628, 640, and 642 identify folders. A folder may (though not necessarily) correspond to a folder of a file system of computer system 100. Records 602 through 642 describe the contents of the root folder.

The relationships of hierarchy 600 may be illustrated as any tree type graph consisting of folder nodes and leaf nodes. For example, tree 700 of FIG. 7 includes a root folder node 602, intermediate folder nodes 604, 612, 620, 628 and leaf nodes 608–610, 614–618, 622–626, and 630–642 numbered to correspond to the records of FIG. 6. Each node of the tree must have a parent node (except the root). In addition, each node may have one or more sibling nodes to the left and right on the same level. A folder node may have zero or more child (i.e., leaf) nodes related to it by branches.

Leaf node data structures for candidate references from which a selected object reference is to be provided may be accessed, according to various aspects of the present invention, from data structure 600 in any manner. For example, a search for all candidates relevant to a request for an object named "REPORT" could be conducted in record serial order beginning with record 602. Alternately, an index (e.g., alphabetical list of object names) may be searched using any technique including for example, a binary tree or balanced tree technique. Further, any tree-search algorithm could be used (with or without an index) such as a depth first search or a breadth first search. A search may be directed in part by criteria related to evaluation of the policy. For example, if the request included a scope criteria specifying root folder 602 then records 604 through 642 would be considered. Alternately, searching may exclude leaf nodes of or below any folder node at the same level as the folder node identified in the scope criteria. If in addition to "REPORT" the scope criteria was specified as application program folder SLICKR, then record 614 would be found as a candidate though record 622 would not be found as a candidate.

Hierarchical data structure 600 may include any organization expressing hierarchical relationships. For example, data structure 800 includes Parent field 802, PreviousSibling field 804, NextSibling field 806, and Child filed 808 each respectively containing an address to another node or a null value. A null value in Parent field 802 designates the root node. A null value in PreviousSibling field 804 designates a first child of the parent. A null value in NextSibling field 806 designates a last child of the parent. A non-null value in Child node 808 designates the structure as a folder.

ObjectName field 810 may contain text (plain or hashed) to be matched to an object identifier in a request. Command-Line field 812 may contain information for activating the object named in field 810. When null, ObjectName may be remote. ChildData field 814 may contain any information used by a local object. Version field 816 may describe the object named in field 810. Policy field 818 may contain a coded data item as discussed above to identify a policy to apply specifically for the object named in field 810. ScopeLink 820 may identify a scope criteria (e.g., similar in format to a scope criteria specification in a request) for directing a search for candidates in a remote naming service. When ScopeLink 820 is null, the object referred to by ObjectName 810 may be local. ObjectReference field 822 may contain a null value when the object named in field 810 has not been activated or a suitable reference value, such as a CORBA reference value, for the object named in field 810. Finally, ActivtyState field 824 may contain information about whether the object named in field 810 is active and any related information such as diagnostic information or system utilization information. Any of the fields may itself be a nested data structure for efficiencies of storage space and speed of access.

The general principles illustrated in the above description of system 100, methods performed by system 100, and data structures stored in memory of system 100 may be extended in variations in accordance with the following observations.

The type of search and the scope of search in the registry of a remote naming service may be defined by default values, implied from the type of the remote naming service, and/or designated in the message requesting an object reference from a remote naming service. Any suitable designation may be stored as part of the value of ScopeLink 820 or, in an alternate data structure, in a separate additional named value. When PNS 214 cooperates with several remote naming services of various types, the identity or object reference of a naming service appropriate to a particular ScopeLink value may be stored as part of the ScopeLink value or, in an alternate data structure, in a separate additional named value.

When more than one remote object has been identified by a search of one or more remote naming services, the corresponding object references may be stored in data structure 600 as separate (additional) records, stored as a list in one record of data structure 600, or stored as a pointer to a linked list referred to from one record of data structure 600. Preferably, such remote object references would not be stored so that current object references would be obtained and used when needed. When a list of remote object references is to be stored, the structure of data structure 600 may be modified in any conventional manner to support a one to many relationship from a folder node having a ScopeLink value to the many object references in the remote folder. Of course, a remote-only policy may be implied for use with all remote object references so obtained.

A request to a preferential naming service may include one or more of the following items of information: an object identifier, a signature criteria, a location criteria, a version criteria, a date last modified criteria for data encapsulated by the object, and search criteria. Search criteria may include any of the following items of information: a starting point, a method of search, a time allotment for remote response, a time allotment for local activation, a syntactically formal SQL query statement (or equivalent), a file system or naming system pathname having wildcards, a maximum acceptable number of communication nodes that would be traversed by the virtual link, and a designation of criteria for selecting a preferred portion of hits from a large number of hits. The later criteria may be expressed as a minimum quantity of hits, such as the first 10 or the next 10. When hits are likely to be identified over a period of time, a time duration during which hits are to be selected may be specified.

Although an object reference is to be treated as opaque by processes that use the object reference for communication, a preferential naming service may analyze the value of an object reference to determine whether a particular object reference meets criteria, for example, a maximum number of communication nodes that would be traversed by the virtual link. In an intranet or internet application, remote object references passed between communication nodes may include source and destination information. If the PNS has determined in any conventional manner that a given bus, link, repeater, bridge, or naming service is no longer available, viability testing of known object references may include examination of the object reference for indicia of the known bad bus, link, repeater, bridge, or naming service. Performance expectations and load balancing may likewise be based on analysis of the value of particular object references. From the knowledge that a particular naming service is unavailable, PNS 214 may conclude that all object references that are local to that naming service may also be unavailable.

Version numbering may express revisions that effect the signature and revisions that do not. For example, a version 4 may be revised to version 4.1 or 5.0 when the signature is affected; or revised to version 4.001 or 4.0.1 when the signature is not affected. Generally a revision to the data in a database controlled primarily by an object will not be reflected in the object's version. Such information about the revision of an underlying database may be used as search criteria as indicated above by date last modified.

Record order may be used to express a policy. For example, in a variation of PNS registry 214 wherein records having identical values for ObjectName and Version are permitted, one record may reflect a policy of remote-only and another may reflect a policy of local-only. When the search method is deterministic to the extent that the order of search results is certain, ordering the remote-only record ahead of the local-only record is equivalent to expressing a remote-preferred policy.

A policy may be stored in alternate PNS registry structures. For example, remote-only and local-only policies may be designated by (a) presence or absence of a value for ScopeLink; or (b) absence or presence of a value for CommandLine. Further, when both CommandLine and ScopeLink have values, an implication may be understood that the policy to be applied is one of (a) local-preferred, or (b) remote-preferred.

A subtree may be grafted onto PNS registry 216 during application program installation or registry update. Such a graft may advantageously bring into the purview of PNS 214 a previously unknown number of object references having previously unknown object identifiers. When PNS 214 evaluates a request for an object reference after such a graft is completed, different object references may become available as candidates as discussed above.

A ScopeLink value may identify a remote or local leaf node, or a remote or local folder node. When PNS 214 seeks candidate records, PNS 214 follows all ScopeLink values that identify local leaf nodes or local folder nodes. For example, local leaf node record 632 specifies "ENCRYPT V2" with a ScopeLink "ROOT\SHARE", understood to refer to a local node. When seeking candidate records for a request for an object reference having ObjectName "ENCRYPT" and a suitable version criteria, PNS 214 will evaluate SHARE as a reference to local folder node record 642. The ScopeLink value of record 642 is also local so PNS 214 continues following the chain of references. At record 642, ScopeLink value "ROOT\2SHARE" is a reference to local folder node record 604. The contents of folder ROOT\2SHARE are therefore included in the search for candidates. Finally, record 606 is included as a candidate. In this example, system peculiar folder name "ROOT\2SHARE" has been effectively substituted for a generic folder name "ROOT\SHARE" used by an application developer. Note that when a local folder node has a ScopeLink value (e.g., record 640), that folder node has zero child records; however, child records logically related to the folder node may be included in a search for candidates, for example, as a temporary list as discussed above with reference to step 515 and 525.

PNS 214 may update ActivityStatus 824 of any record to indicate that the object reference had been supplied in response to a request and may record there a date and time of the latest such request. Such information may be used in determining (or making an inference about) viability, in load leveling, or in other management functions.

Data, data structures, objects (e.g., class definitions), and other indicia of methods of the present invention may be stored in any conventional memory. A memory includes any one or more nonvolatile or volatile data storage devices including integrated circuit memory, semiconductor memory, optical memory, CDROM, magnetic tape, and magnetic disk.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A memory comprising indicia of a method for providing an object reference, the method executed on a first workstation, the method comprising:

in response to a request that originated on the first workstation, the request comprising a first object identifier, determining a policy in accordance with the first object identifier;

determining, in further response to the request, a selected object reference in accordance with the policy, wherein the policy governs selection between first indicia of a first object that would, if selected, execute on the first workstation and second indicia of a second object that would, if selected, execute on a second workstation; and providing the selected object reference.

2. The memory of claim 1 wherein:

a. the request further comprises a version criteria; and b. the step of determining a policy further comprises determining the policy in accordance with the version criteria.

3. The memory of claim 1 wherein for a particular policy the determination of the object reference avoids selecting the second object.

4. The memory of claim 1 wherein the method further comprises obtaining from a naming service a second object reference, the second object reference corresponding to the second object.

5. The memory of claim 4 wherein the step of obtaining is in further response to the request.

6. The memory of claim 1 wherein:

a. the request further includes a first scope; and b. the step of determining the policy is performed in further accordance with the first scope.

7. The memory of claim 6 wherein the indicia of the second object comprises a second scope.

8. The memory of claim 1 wherein the step of determining the selected object reference further comprises activating on the first workstation an object corresponding to the first object identifier.

9. A memory comprising indicia of a method for installing an application program, the method comprising:

installing a first naming service on a first workstation;

forming a registry on the first workstation for use by the first naming service, the registry comprising an object identifier and a policy; and installing the application program for execution at least in part on the first workstation so that the application program makes a first request to the first naming service to obtain an object reference in accordance with the policy; wherein the policy governs selection between first indicia of a first object that would, if selected, execute on the first workstation and second indicia of a second object that would, if selected, execute on a second workstation.

10. The memory of claim 9 wherein the step of forming the registry further comprises making a second request to a second naming service to obtain the object reference.

11. The memory of claim 10 wherein the method further comprises installing a finding service on a third workstation, the finding service for returning to the first naming service a third object reference for communication between the first naming service and the second naming service.

12. The memory of claim 9 wherein:

the registry existed on the first workstation prior to installation; and the step of forming the registry comprises revising the registry in accordance with a strategy of the application program being installed.

13. The memory of claim 9 wherein the step of forming the registry comprises enabling the first naming service to obtain and to store a plurality of object references in the registry.

14. The memory of claim 9 wherein the memory further comprises indicia of at least one of the set consisting of the first naming service, the registry, and the object request broker.

15. A memory comprising indicia of a data structure, the data structure comprising:

a. a first object identifier; and b. a policy for determining whether a first object reference is to be provided in response to a request, the request comprising a second object identifier corresponding to the first object identifier.

16. The memory of claim 15 wherein:

a. the request originates on a first workstation; and b. the policy governs selection between first indicia of a first object that would, if selected, execute on the first workstation and second indicia of a second object that would, if selected, execute on a second workstation.

17. The memory of claim 15 wherein:

a. the first object identifier identifies an object having a version; and b. the data structure further comprises a first version indicator corresponding to the version.

18. A plurality of component data structures individually comprising:

a first object identifier;

a policy for determining whether a first object reference is to be provided in response to a request, the request comprising a second object identifier corresponding to the first object identifier; and a reference to a respective parent component data structure of the plurality of component data structures.

19. The data structure of claim 18 wherein:

a. each component data structure corresponds to a respective element of a tree graph, each respective element being related to other elements by one or more of the relationships of a set consisting of parent, child, and sibling; and b. a first component data structure corresponding to a particular element further comprises a reference for determining a scope of a search, the reference being to a second data structure that is not related as a parent, is not related as a sibling, and is not related as a child.

20. The data structure of claim 18 wherein the reference identifies a folder of a second naming service.

* * * * *